Nov. 18, 1958     H. E. ERICKSON ET AL     2,860,790
FEEDER FOR FILLING SILOS AND LIKE STRUCTURES
Filed Feb. 21, 1956

INVENTORS
Harold E. Erickson
Byron B. Brookhyser
BY
Atty.

2,860,790

FEEDER FOR FILLING SILOS AND LIKE STRUCTURES

Harold E. Erickson, Auburn, and Byron B. Brookhyser, Milton, Wash.; said Erickson assignor to Dale L. Schubert, Tacoma, Wash., and said Brookhyser assignor to Columbia Veneer Company, Seattle, Wash., a corporation of Washington Application February 21, 1956, Serial No. 566,933

6 Claims. (Cl. 214—17)

This invention relates to feeding apparatus for filling silos and like structures.

In filling silos it is imperative that the feed material be distributed evenly as it is fed into the silo. This is important first to distribute the weight of the silo contents uniformly against the silo walls, thereby preventing damage to the silo; second, to realize the maximum storage capacity of the silo; and third, to make possible optimum performance of silo unloaders of the class which discharge the silo contents continuously from the top thereof, i. e. of rotary, top-type silo unloaders. This is especially true where the silo is used for the storage of wood chips or wood particles to be fed to a continuously operating plant for the manufacture of wood composition boards such as insulation board and hardboard.

Accordingly it is the general object of the present invention to provide a silo feeder which will feed a variety of materials continuously into a silo, building up a uniform deposit of the material within the silo, and cooperating effectively with a rotary, top-type silo unloader.

Figure 2:
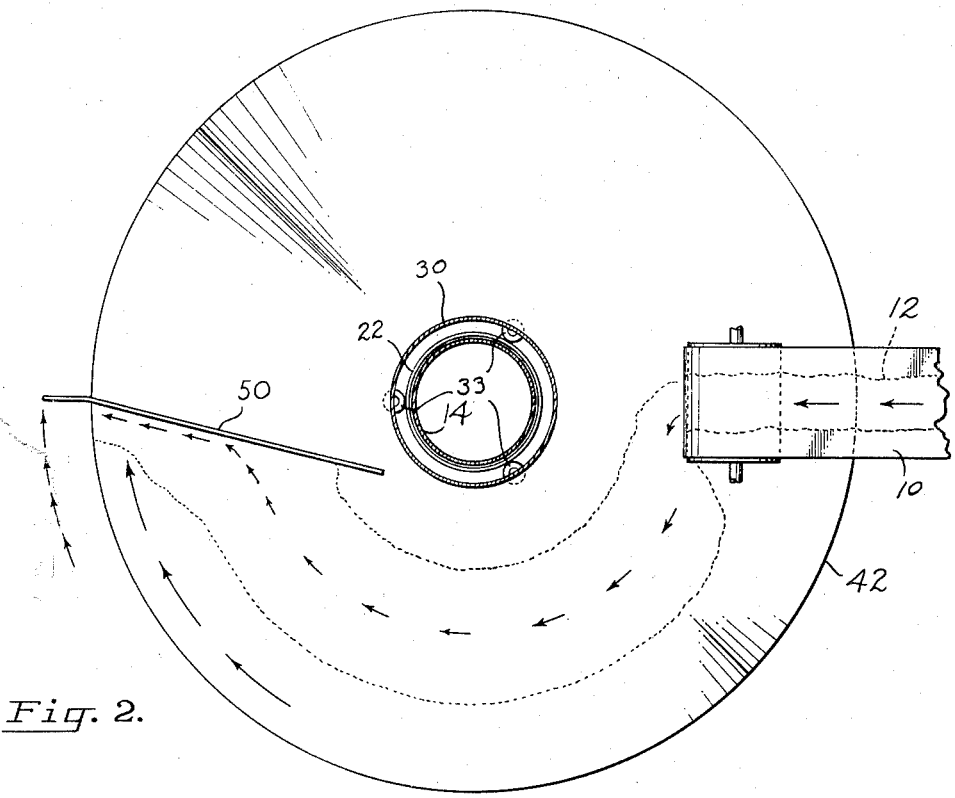
Figure 1:
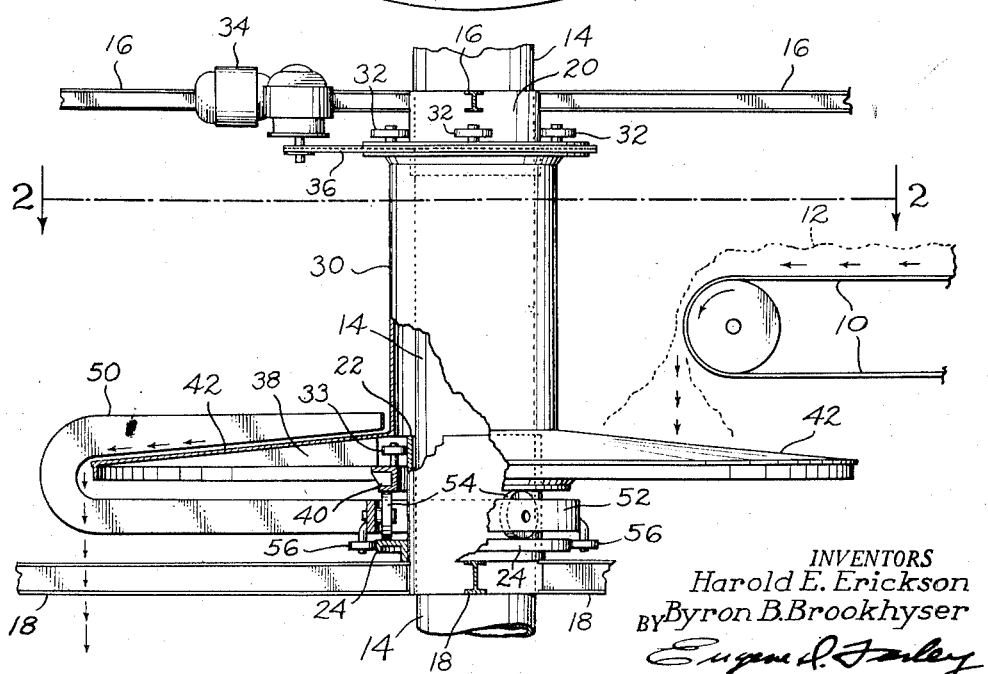

The presently described silo feeder will be discussed herein with particular reference to the drawings, wherein:

Fig. 1 is a view in elevation, partly in section, of the herein described silo feeder; and Fig. 2 is a plan view, partly in section, taken along line 2—2 of Fig. 1 of the herein described silo feeder.

Generally stated, the silo feeder of our invention comprises a plate having a diameter smaller than the internal diameter of the silo and an outer surface adapted for the deposition of the material with which the silo is to be filled. The plate is mounted rotatably in a horizontal position within the central portion of the silo, toward the top thereof.

Deflector means such as a deflecting arm is mounted across the upper surface of the plate for spreading material deposited on the plate across the surface thereof, and for deflecting it over the edge of the plate in a uniform stream. Means also are provided for driving the deflector in the direction of rotation of the plate but at a rotational speed which is less than that of the plate, thereby insuring uniform delivery from the plate. In this way an even deposit of the material is built up in the silo beneath the plate.

Considering the foregoing in greater detail and with particular reference to the drawings:

The silo feeder of our invention is adapted for use in a silo of the usual construction designed for the storage of animal feeds, wood chips, or other materials. At or near the top of the silo is means for introducing the material to be stored. This may comprise, for example, a conveyor belt 10, by means of which the material 12 may be introduced in a continuous but irregular stream to the interior of the silo.

The presently described feeder is mounted within the silo in a position to intercept this flow and distribute it evenly about the silo so that a surface-type silo unloader may work effectively on the contents of the silo, contemporaneously with the feeder if so desired.

In the illustrated form, the feeder is mounted on a central vertical column 14 which may extend substantially the full height of the silo. If desired, the off bearing conduit of the silo unloader may be contained within this column.

Column 14 is supported by the rigid brace members 16, 18. It is provided with wear sleeves 20, 22 and with an annular track 24. This track has two tracking surfaces, the one being the upper surface and the other the peripheral surface, the functions of which will appear hereinafter.

A hollow shaft 30 is mounted for rotation spaced apart from column 14. At its upper end shaft 30 is thus spaced by means of wheels 32 which run in a horizontal plane on sleeve 20. At its lower end it is thus spaced by a plurality of wheels 33 which rotate in a horizontal plane and track against sleeve 22.

The drive means for rotating shaft 30 may include a gear head motor 34 which is interconnected by means of chain 36 with a sprocket on the upper end of the shaft.

Rigidly affixed to the lower portion of shaft 30 are a plurality of spaced, radially extending structural members 38 to which is affixed a second annular track 40. Members 38 support a plate 42 which has a diameter appreciably less than the internal diameter of the silo so that a space is left between the edge of the plate and the silo side walls. Preferably the plate has a downwardly sloping surface which is adapted to receive material 12 as it flows in an irregular stream from belt 10.

The deposit of material on plate 42 is concentrated in the region directly beneath the belt. Accordingly, means are provided for spreading it over the surface of the plate and for deflecting it in a uniform, steady flow over the edge of the plate whereupon it gravitates downwardly to the bottom of the silo.

In the illustrated form, the means employed to perform these spreading and deflecting functions comprises a substantially U-shaped arm 50. The upper segment of this arm has a length substantially equal to the width of the top surface of plate 42. It is spaced slightly apart from the plate and lies at a horizontal angle which is slightly inclined toward the feed direction (Fig. 2).

The weight of shaft 30, plate 42 and arm 50 is borne by a wheel assembly interposed between track 24 on column 14 and track 40 on structural members 38 which plate 42 overlies. The wheel assembly includes a ring 52 to which arm 50 is secured. Mounted for rotation in a vertical plane on the ring are a plurality of load-supporting wheels 54 which track on the upper surface of track 24. Mounted for rotation in a horizontal plane on the ring are a plurality of guide wheels 56 which track on the peripheral surface of track 24.

Wheels 54, which support the assembly, also act as driving means for arm 50. Thus as shaft 30 rotates, its motion will cause rotation of wheels 54, which engage track 40. This in turn will cause rotation of ring 52, on which wheels 54 are mounted and of arm 50 carried by the ring, in the same direction, but at one-half the speed of shaft 30 and plate 42. In this manner there is secured the retarded rotation of arm 50 across the surface of plate 42 which is required for efficient spreading of material deposited on the plate and its discharge over the edge of the plate.

Operation

In operation, the herein described feeding apparatus is mounted on column 14 or other suitable means near the top of the silo with plate 42 placed below conveyor belt 10 which introduces a continuous but irregular flow of wood chips or other feed material 12 into the silo. Shaft 30 is driven continuously at a predetermined rate by gear head motor 34. This in turn will rotate plate 42 so that the material is deposited in a concentrated ring near the center of the plate.

The material on the plate is spread and deflected over the edge of the plate by means of arm 50 which rotates with shaft 30 in the same direction as the plate but at a lesser velocity. Driving of arm 50 in this manner is secured by means of wheel and track means including wheels 54, the upper peripheral surfaces of which ride on track 40 on the shaft assembly, and the lower peripheral surfaces of which ride on track 24 on column 14. Hence engagement of the wheels with track 40, which rotates with the shaft 30, causes movement of wheels 54 and driving of arm 50 in the same direction as plate 42 by at one-half the velocity. This in turn results in the desired uniform discharge of material from the plate surface.

In this manner there is provided a silo feeder which may be used for filling silos with a wide diversity of feed materials. It is well adapted for feeding systems wherein the material is introduced into the silo in an irregular stream. It serves to disperse this stream and to build it up uniformly over the cross sectional area of the silo. As a consequence, the load within the silo is distributed evenly against the side walls of the same, preventing damage to the silo.

Filling of the silo may be accomplished contemporaneously with the operation of surface silo unloading apparatus which removes material from the surface of the silo charge in the quantities required for operation of a composition board plant or other purposes. Also, the smooth and efficient operation of the silo unloader is insured since the density and contour of the silo charge area in which it works is substantially uniform.

It is to be understood that the form of our invention herewith shown and described is to be taken as a preferred example of the same and that various changes in the shape, size and arrangement of parts may be resorted to without departing from the spirit of our invention or the scope of the appended claims.

Having described our invention, we claim:

1. A feeder for filling silos and like structures comprising a plate having a diameter smaller than the internal diameter of the silo and an upper surface adapted for the deposition of material thereon, means for rotatably mounting the plate in a horizontal position within the silo centrally thereof, material deflecting means to be arranged across the upper surface of the plate, means for mounting the deflecting means for rotation, drive means interconnecting the plate and deflecting means for simultaneous rotation of the deflecting means by rotation of the plate and in the direction of rotation of the plate but at a speed less than that of the plate, and power means operatively connected to the drive means for driving the latter.

2. The feeder of claim 1 wherein the drive means comprises wheel and track means interconnecting the deflecting means and the plate for rotating the deflecting means by rotation of the plate, the rotation of the deflecting means being in the same direction as the plate but at substantially one-half the rate of rotation of the plate.

3. A feeder for filling silos and like structures comprising a shaft, means for rotatably mounting the shaft vertically centrally of the silo, drive means connected to the shaft for rotating it at a measured rate, first annular track means connected to the bottom end of the shaft, a horizontal plate having a diameter smaller than the interior diameter of the silo rigidly affixed to the lower portion of the shaft above the first track means, the upper surface of the plate being adapted to receive a flow of material fed into the silo, second annular track means mounted below the first annular track means independently thereof, wheel means interposed between the first and second annular track means and in tracking engagement therewith, at least part of the weight of the shaft and plate being supported by the wheel means, and material deflecting means connected to the wheel means and driven thereby in the direction of rotation of the plate, but at a lesser rotational speed, the material deflecting means acting to spread material fed onto the plate across the surface thereof and to deflect it over the edge thereof, thereby building up a uniform deposit of material in the silo below the plate.

4. The feeder of claim 3 wherein the material deflecting means comprises a substantially U-shaped arm extending radially from the wheel means and across the upper surface of the plate in close proximity thereto.

5. A feeder for filling silos and like structures comprising a plate having a diameter smaller than the internal diameter of the silo and an upper surface adapted for the deposition of material thereon, means for rotatably mounting the plate in a horizontal position within the silo centrally thereof, material deflecting means arranged across the upper surface of the plate, means for rotatably mounting the deflecting means, drive means interconnecting the plate and deflecting means for simultaneous rotation of the deflecting means by rotation of the plate, and power means operatively connected to the drive means for driving the latter.

6. A feeder for filling silos and like structures comprising a plate having a diameter smaller than the internal diameter of the silo and an upper surface adapted for the disposition of material thereon, means for rotatably mounting the plate in a horizontal position within the silo centrally thereof, drive means connected to the plate for rotating the latter, material deflecting means arranged across the upper surface of the plate, means for rotatably mounting the deflecting means, and drive means connected to the deflecting means for rotating the latter in the direction of rotation of the plate but at a speed of rotation less than that of the plate.

References Cited in the file of this patent

FOREIGN PATENTS

| 125,895 | Australia | Oct. 22, 1947 |
| 670,821 | Great Britain | Apr. 23, 1952 |
| 932,659 | Germany | Sept. 5, 1955 |

UNITED STATES PATENT OFFICE
CERTIFICATE OF CORRECTION

Patent No. 2,860,790                                                  November 18, 1958

Harold E. Erickson et al.

It is hereby certified that error appears in the printed specification of the above numbered patent requiring correction and that the said Letters Patent should read as corrected below.

Column 3, line 49, claim 1, after "means" strike out "to be".

Signed and sealed this 21st day of April 1959.

(SEAL)
Attest:

KARL H. AXLINE
Attesting Officer

ROBERT C. WATSON
Commissioner of Patents